June 3, 1947.                L. ANDRUS                2,421,534
                           BEET HARVESTER
                         Filed Feb. 3, 1944            2 Sheets-Sheet 2
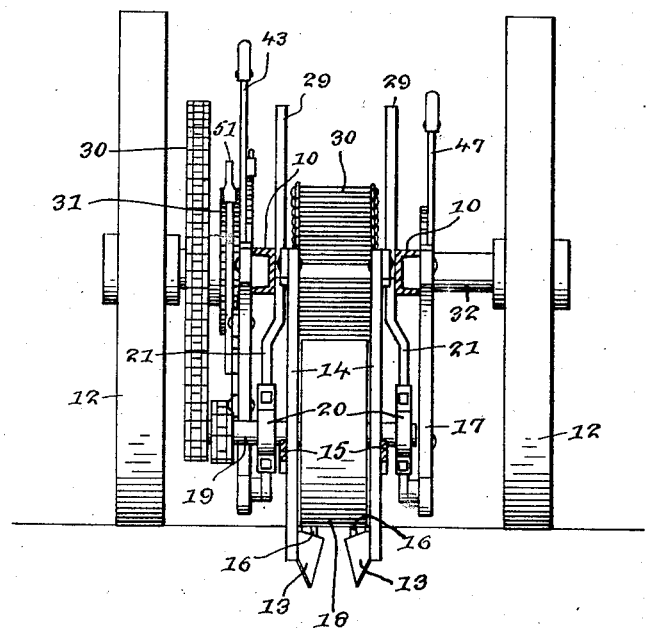
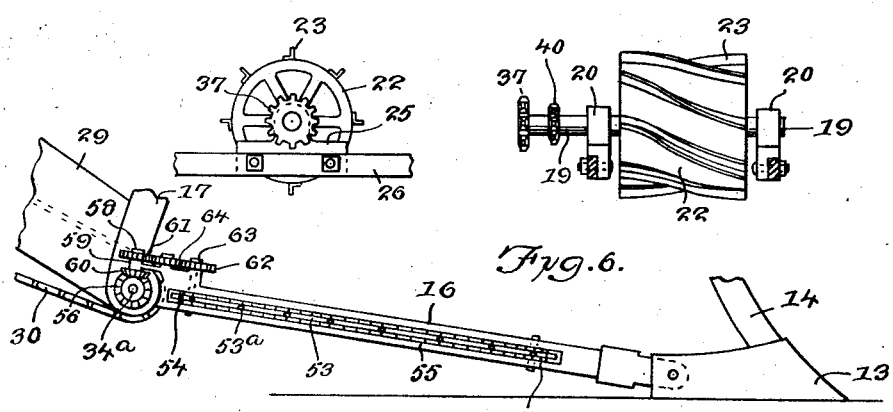
Lester Andrus
INVENTOR Patented June 3, 1947

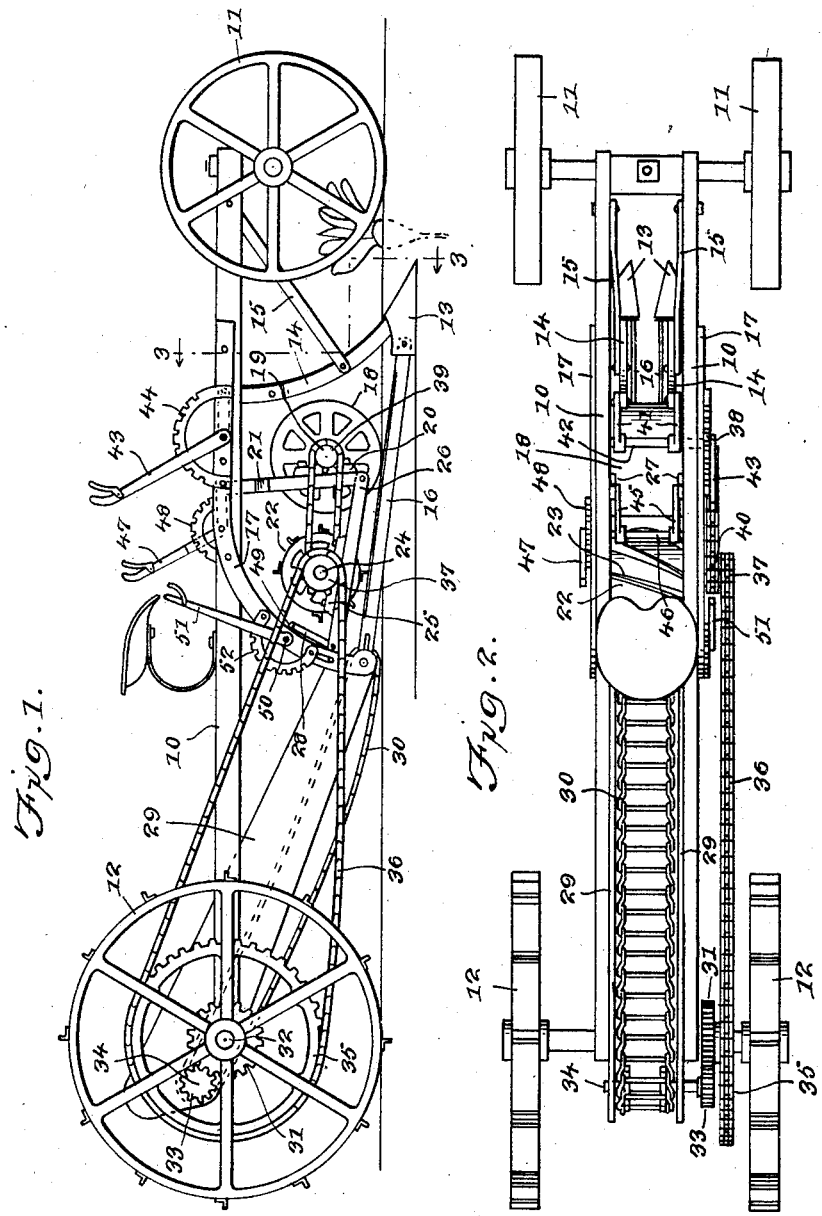

2,421,534

UNITED STATES PATENT OFFICE 2,421,534

BEET HARVESTER

Lester Andrus, Glenwood Springs, Colo.

Application February 3, 1944, Serial No. 520,928

2 Claims. (Cl. 55—108)

This invention relates to beet harvesters and has for an object to provide a machine adapted to dig, top and deliver topped beets, carrots and other similar root vegetables or plants with greater expediency than similar devices hitherto employed for the purpose.

A further object is to provide a novel arrangement of plow blades for cutting under the root plant from either side and slightly elevating both the plant and clump of soil around the root, a track upon which the uplifted plant and soil travel rearwardly from the plow blades, a leveler drum adapted to pass over and level all of the plants to the same plane, a cutting knife for severing the tops of the leveled plants, and an elevator for separating the severed tops from the roots and discharging the roots from the machine.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of a beet harvester constructed in accordance with the invention.

Figure 2 is a plan view of the beet harvester shown in Figure 1.

Figure 3 is a vertical sectional view of the beet harvester taken on the line 3—3 of Figure 1, looking in the direction of the arrowheads.

Figure 4 is a side elevation of the topping drum.

Figure 5 is a front elevation of the topping drum.

Figure 6 is a view in side elevation of a slightly modified form of the beet harvester.

Referring now to the drawings in which like characters of reference designate similar parts in the various views, 10 designates the longitudinal frame bars of the beet harvester, the same being equipped at the front ends with dirigible wheels 11 and being equipped at the rear ends with traction wheels 12. A pair of plow shares or blades 13 are secured to the frame bars by respective beams 14 and brace bars 15 and these blades are so spaced apart as to cut under the root plant from either side, and slightly elevate both the plant and clump of soil around the root.

Pivotally connected to the rear ends of the blades 13 are a pair of rails 16 which form a track upon which the uplifted plant and soil travel rearwardly from the blades as the machine continues to move forward. The bars are adjustably secured at the rear ends to bracket arms 17 which, as best shown in Figure 1, are substantially arcuate in contour and have straight upper ends bolted to the frame bars 10.

A leveler drum 18 is suspended from the frame bars directly in rear of the blades 13. The shaft 19 of the drum is journaled in bearings 20 carried by bracket arms 21 which are secured to the frame bars 10, as best shown in Figure 3. As forward movement of the machine draws the track rails 16 under the uplifted root and soil, the leveler drum rotates upon and levels the mass so that the tops of all the roots are leveled to a common plane.

A topping drum 22 is disposed above and near the rear end of the track 16 directly in rear of the leveler drum 18, as best shown in Figures 1 and 2. The topping drum is provided with spirally arranged blades 23, best shown in Figure 5, which severs the top from the plant when the plants travelling rearwardly from the blades 13 on the rails 16 pass beneath the topping drum 22. The shaft 24 of the topping drum is journaled in bearings 25 which are mounted upon bars 26. The front ends of the bars 26 are pivotally connected to the lower ends by bracket arms 27 which depend from the frame bars 10. The rear ends of the bars 26 are adjustably connected to the beforementioned bracket arms 17 by links 28.

Immediately after the leveling operation, during continued forward movement of the machine, the rotating topping drum coacting with the track severs the tops from the plants.

Mounted on the machine in position to receive roots and severed tops from the track 16, is an endless elevator comprising side walls 29 and a web 30 formed of links through which dirt and tops may gravitate out of the machine while the roots are carried upwardly and discharged from the rear of the machine into any convenient receptacle.

A sprocket gear 31 is fixed to the axle 32 of the traction wheels 12 and meshes with a sprocket pinion 33 which is fixed to the driving shaft 34 of the endless elevator. A sprocket gear 35 is fixed to the traction wheel axle 12 and a sprocket chain 36 is trained over this gear and a sprocket gear 37 which is fixed to the shaft 24 of the topping drum. This chain drive is proportioned to drive the topping drum at any predetermined speed ratio with respect to the speed of the traction wheels.

The leveler drum 18 is driven from the topping drum and for this purpose a sprocket chain 38 is trained over sprockets 39 and 40 carried by the shaft 19 of the leveler drum and shaft 24 of the topping drum.

As best shown in Figures 1 and 2, for adjusting the penetration of the blades 13 the beams 14 are pivotally connected at the upper ends to crank arms 41 which are fixed to a crank shaft 42 mounted on the frame bars 10. A conventional lever 43 and rack 44 are secured to the crank shaft and to one of the side rails, respectively, for raising and lowering the blades 13.

For adjusting the leveler drum 18 vertically the upper ends of the bracket arms 27 are connected to the ends of crank arms 45 which are carried by a crank shaft 46 to which is fixed a handle lever 47 which is associated with a rack 48 in the conventional manner.

For adjusting the topping drum vertically independently of the leveler drum the beforementioned links 28 are connected to crank arms 49, best shown in Figure 1. The crank arms are fixed to a crank shaft 50 to which is fixed an operating lever 51 having associated therewith a rack 52 in the conventional manner.

As shown in Figure 6, the machine is preferably provided with means for assisting the movement of the beets from the blades 13 to the topping drum 22 and from the topping drum to the elevator 30. This means comprises endless chains which extend longitudinally of the rails 16 and which are supported by sprockets 54 in slots 55 formed in the rails. The chains 53 are provided with pins 53a which extend inwardly beyond the inner sides of the rails 16 and which engage the beets so as to effect the positive movement of the beets rearwardly after they have left the ground. The lower shaft 34a of the elevator 30 is driven by the elevator and the chains 53 are driven from this shaft by means comprising beveled gears fixed to the outer ends of the shaft, shafts 58 journaled in bearings 59 carried by the bracket arms 15, and bevel gears 60 carried by the shaft and engaging the beveled gears 56. This means also comprises gears 61 fixed to the shafts 58, gears 62 fixed to the rear shafts 63 of the sprockets 54 and intermediate gears journaled upon the rails 16.

Since the operation of the parts has been described as the description of the parts progressed it is thought that the invention will be fully understood without further explanation.

What is claimed is:

1. In a beet harvester, a supporting frame, plow blades spaced apart and connected to the frame adapted to cut under a root plant from either side and slightly elevate the plant, parallel rails pivotally connected to the frame, and the rear ends of the blades endless chains extending longitudinally of the rails upon which the uplifted plants travel rearwardly from the plow blades, said rails adapted to align said blades and prevent swinging movement thereof during the digging operation thereof.

2. The invention as in claim 1 wherein said blades are secured to said frame by arcuate shaped beams, and said beams are connected intermediate their ends by angular brace bars secured to said frame.

LESTER ANDRUS.

REFERENCES CITED

The following references are of record in the file of this patent:

UNITED STATES PATENTS

| Number | Name | Date |
|---|---|---|
| 1,341,909 | Johnston | June 1, 1920 |
| 637,656 | Parker | Nov. 21, 1899 |
| 795,100 | Burtless | July 18, 1905 |
| 1,800,622 | Granberg | Apr. 14, 1931 |
| 835,600 | Chambers | Nov. 13, 1906 |
| 1,124,406 | Feuerstein | Jan. 12, 1915 |